(12) United States Patent
Lell

(10) Patent No.: US 11,444,446 B2
(45) Date of Patent: Sep. 13, 2022

(54) METHOD AND DEVICE FOR PERMANENT DISCONNECTION OF AN ELECTRICAL CIRCUIT WITH AN INDUCTIVE LOAD BY SWITCHING TWO SWITCHES

(71) Applicant: Peter Lell, Moosburg (DE)

(72) Inventor: Peter Lell, Moosburg (DE)

( * ) Notice: Subject to any disclaimer, the term of this patent is extended or adjusted under 35 U.S.C. 154(b) by 332 days.

(21) Appl. No.: 16/781,003

(22) Filed: Feb. 4, 2020

(65) Prior Publication Data

US 2020/0287372 A1    Sep. 10, 2020

(30) Foreign Application Priority Data

Feb. 5, 2019   (DE) .......................... 102019102858.2

(51) Int. Cl.
*H02H 3/00* (2006.01)
*H02H 3/12* (2006.01)
*H02H 1/00* (2006.01)

(52) U.S. Cl.
CPC ............ *H02H 3/12* (2013.01); *H02H 1/0007* (2013.01)

(58) Field of Classification Search
None
See application file for complete search history.

(56) References Cited

U.S. PATENT DOCUMENTS

| 4,764,836 | A | 8/1988 | Mauthe et al. | |
| 6,381,115 | B1 * | 4/2002 | Chan | G11C 17/18 361/115 |
| 9,911,560 | B2 * | 3/2018 | Lell | H01H 39/006 |
| 2005/0219032 | A1 | 10/2005 | Williams et al. | |
| 2020/0223315 | A1 * | 7/2020 | Binder | H02H 7/22 |

FOREIGN PATENT DOCUMENTS

| DE | 102012217280 A1 | 3/2014 |
| DE | 102014107853 A1 | 7/2014 |
| DE | 102014110825 A1 | 9/2014 |
| DE | 202015100525 U1 | 2/2015 |
| DE | 102015114279 A1 | 10/2015 |
| DE | 102015114894 A1 | 11/2015 |
| DE | 102015112141 A1 | 1/2017 |
| DE | 102016124176 A1 | 1/2017 |
| DE | 102017123021 A1 | 12/2017 |
| EP | 0231469 A1 | 8/1987 |
| FR | 2905796 A1 | 3/2008 |
| WO | WO-2008031671 A1 | 3/2008 |

* cited by examiner

*Primary Examiner* — Stephen W Jackson

(74) *Attorney, Agent, or Firm* — Perry + Currier, Inc.

(57) ABSTRACT

A device for permanently secure disconnection of an electric circuit with high currents at high voltages with an inductive load is provided. The device has a first and a second switch/switch group, connected to each other in series and can be transferred from a closed state into a separated state for disconnecting the electric circuit, wherein none of the switches/switch groups is formed such that it is capable of permanently disconnecting the electric circuit by itself, and a control unit, which actuates the second switch/switch group and which is formed such that the second switch/switch group is transferred from the closed state into the separated state after the first switch/switch group. Further provided is an electric circuit which includes the device and a voltage source, a load resistance and an inductive load. A method using the device is also provided.

14 Claims, 4 Drawing Sheets

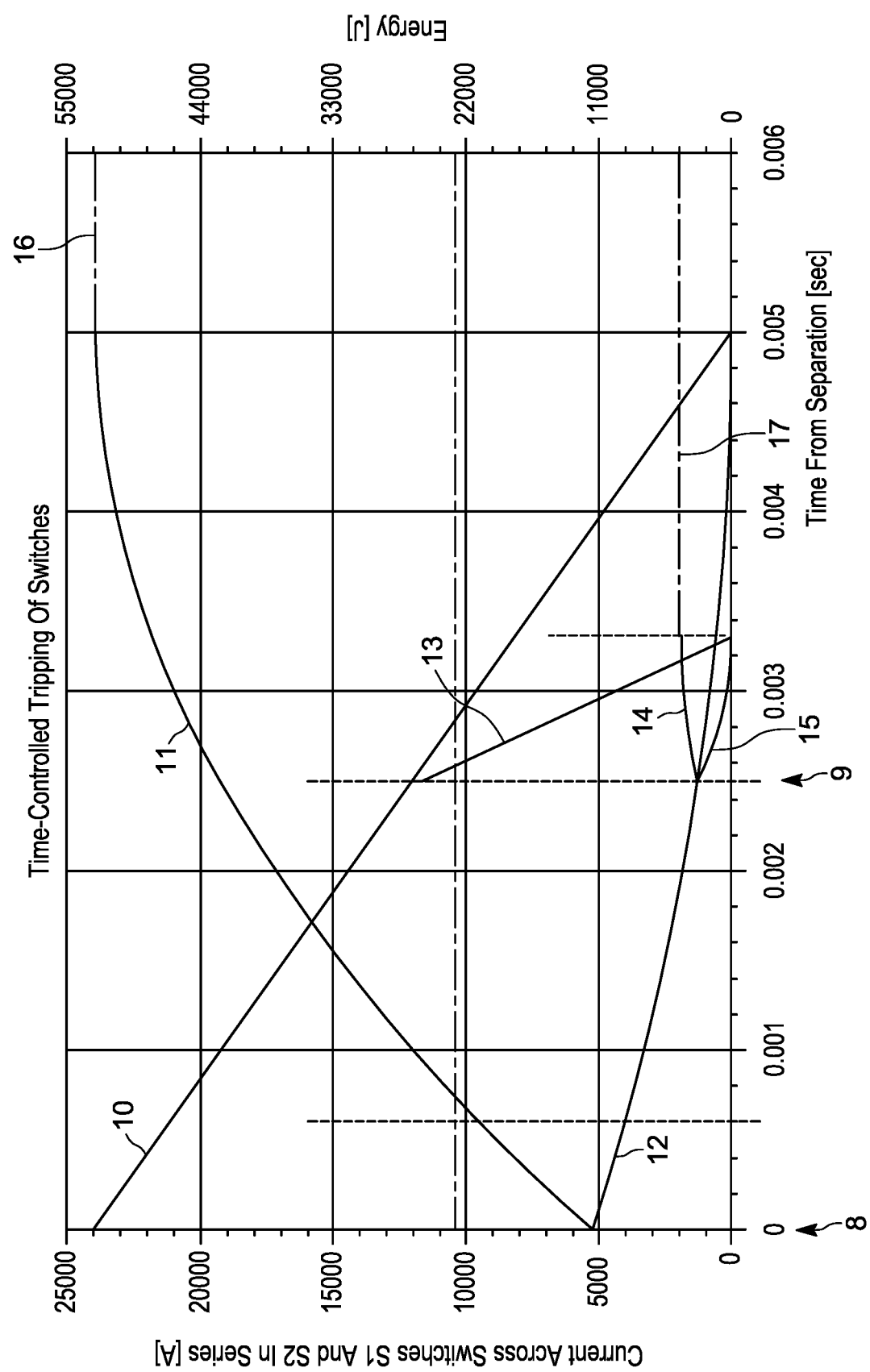

Figure 1:
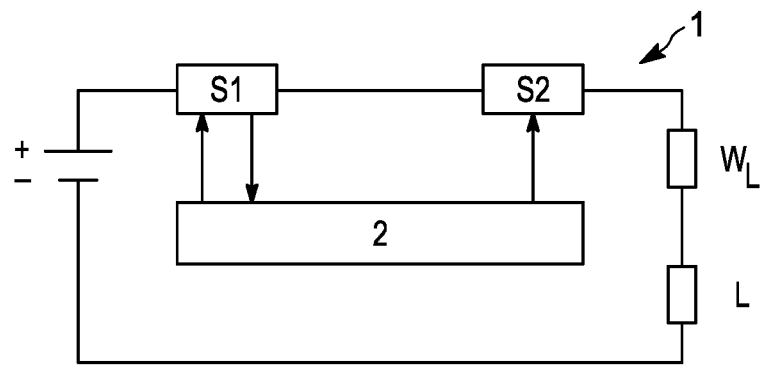

METHOD AND DEVICE FOR PERMANENT DISCONNECTION OF AN ELECTRICAL CIRCUIT WITH AN INDUCTIVE LOAD BY SWITCHING TWO SWITCHES

The invention relates to a device for the permanently secure disconnection of an electric circuit with high currents at high voltages with an inductive load. The device has a first and a second switch/switch group, which are connected to each other in series and can be transferred from a closed state into a separated state for disconnecting the electric circuit, wherein none of the switches/switch groups is formed such that it is capable of reliably and permanently disconnecting the electric circuit by itself, and a control unit, which actuates the second switch/switch group and which is formed such that the second switch/switch group is transferred from the closed state into the separated state after the first switch/switch group. Equally, the present invention also relates to an electric circuit, which in addition to the device according to the invention also has a voltage source, a load resistance and an inductive load, as well as to a method using the device according to the invention.

A disconnection of electric circuits with high currents at high voltages is often possible only with switches which tolerate a high energy input without being destroyed. Until now, switches which have a separation region which is present within an extinguishing agent or is in contact with the at least one extinguishing agent have often been used for this. Through the extinguishing agent, an electric arc which forms after the separation of the separation region is to be extinguished, depleted or at least disrupted. The cause of the formation of an electric arc is the energy stored in the circuit inductance in the form of a magnetic field at the moment that the current is disconnected, which energy is introduced into the switch immediately after the disconnection. This means that a high-energy electric arc occurs in particular when electric circuits with a high inductive load are disconnected. Because most extinguishing agents and plastics contain carbon atoms, these atoms are broken down in the extreme heat of the electric arc of well above 2000° C. and then form an electrically conductive carbon layer on cooling, or the heat of the electric arc makes the extinguishing agent completely or partially electrically conductive. Although such switches can actively or passively shut off electric circuits at high source voltage and high current strengths, here the inductance of the electric circuit to be shut off determines whether this switch is and remains highly insulating after the current interruption or becomes more or less conductive again later. The same applies to materials used in the switch, which mostly contain halides such as chlorine or fluorine—here too, after the current has been shut off, although the electrical conductivity of the highly-heated plasma still present in the switch is very low, it becomes extremely high when the plasma cools once the disconnection of the electric circuit is complete. Here, a few milliseconds are already sufficient for the cooling time. Consequently, although at first it is possible to interrupt the electric circuit with such switches, a permanently secure disconnection with a high insulation resistance always required cannot be guaranteed. Some of the switches currently used are already suitable for shutting off a voltage of 450 V to 850 V usual in motor vehicles and currents in the electric circuit of up to 20 kA at the moment of the disconnection. However, in the case of currents to be disconnected up to 30 kA, voltages of 1250 V, and in the case of buses and HGVs even over 2000 V, are expected in future in this field, with the result that the switches used until now can no longer permanently and securely shut off such electric circuits as an individual assembly.

The object of the present invention is therefore to provide a possibility for permanently and securely disconnecting electric circuits with high currents and high voltages with a high inductive load, in the case of which previous high-current/high-voltage switches fail. It is intended to securely prevent such a switch from becoming conductive again within a short time after the disconnection. Furthermore, it is intended to prevent the switch from being destroyed after the tripping operation by high steady currents flowing in the case of insufficient insulation resistance.

This object is achieved through the provision of a device according to the present specification, an electric circuit according to the present specification, as well as a method according to the present specification.

The device for disconnecting an electric circuit with an inductive load according to the invention has a first and a second switch/switch group, which are connected to each other in series and can be transferred from a closed state into a separated state for disconnecting the electric circuit, wherein none of the switches/switch groups is formed such that it is capable of permanently disconnecting the electric circuit by itself. Furthermore, the device according to the invention has a control unit, which actuates the second switch/switch group and which is formed such that the second switch/switch group is transferred from the closed state into the separated state after the first switch/switch group.

In the following, the term "switch" is intended to represent an individual switch, but also a switch group.

Also included here are switches/switch groups in which more than two switches or individual assemblies are actuated one after the other. The tripping principle or protective principle is the same, for the sake of simplicity only two switches/switch groups are ever described here.

When the electric circuit is disconnected by the first switch, the energy stored in the circuit inductance is introduced into the first switch. This energy leads to an electric arc between the two separated ends of a separation element of the switch. In the process, an amount of energy is introduced into the first switch, which would lead to the first switch becoming conductive again or being destroyed after the actual separation operation. Through the time-delayed tripping of the second switch, the amount of energy which is introduced into the first switch can be reduced since some of the energy to be dissipated is introduced into the second switch, which moreover additionally encounters or must tolerate only a considerably lower tripping load with regard to current and voltage via its connecting element at the moment of its actuation. This also enables the electric circuit to be interrupted before a circuit inductance, which the second switch would not tolerate, can build up again due to the first switch becoming conductive again. Each switch could not tolerate all of the energy stored in the circuit inductance by itself, it would either be destroyed or become conductive again and thus would not be capable of permanently and securely disconnecting the electric circuit. In this way, electric circuits with such a high inductive load, for which one switch alone would not be sufficient, can be permanently and securely disconnected.

A special type of actuation or tripping of the two switches/switch assemblies is the simultaneous actuation of the two switches. The voltage dropping across each of the two switches would thus be halved; the energy flowing into the individual switches would thus likewise be halved. Both switches would thus be loaded equally, assuming an identical design of the two switches. For lower circuit inductances, this may still be acceptable, but at higher circuit inductances there is the danger that both assemblies become conductive again after the disconnection, which would not be acceptable at all. It would thus also not be possible to utilize the very high separability of the individual switches because it would be necessary here to have the insulation resistance after the separation in mind in the case of both switches, and it would not be possible to use the second switch only with/at an extremely low tripping load.

Also, different types of switch could only be combined with each other if actuation and separation operations are staggered one after the other in time. Thus, for example, a switch with high separability at high voltage and high current at the moment of its actuation, like the so-called power fuse (see FIG. 5), can be used as first switch, whereas a conventional battery cut off switch which could not trip a high current at high voltage by itself can be used as second switch in the electric circuit because, at that point in time, thus after the separation operation of the first switch, this must only separate a low voltage at a low current and in this connection also need not use an extinguishing agent.

According to the invention, as first switch, one which is a high-current/high-voltage switch, i.e. is capable of reliably disconnecting electric circuits with high currents at high voltages, is preferably used. As a rule, such high-current/high-voltage switches can reliably and permanently disconnect electric circuits with currents up to 30 kA and voltages up to 2000 V. Such high-current/high-voltage switches are known for example from DE 10 2014 107 853 A1, DE 10 2014 110 825 A1, DE 20 2015 100 525 U1, DE 10 2015 112 141 A1, DE 10 2015 114 279 A1, DE 10 2015 114 894 A1, DE 10 2016 124 176 A1 and DE 10 2017 123 021 A1. If the switch is a switch group, then it preferably comprises or preferably consists of a parallel circuit consisting of one or more safety fuses and a conventional battery cut off switch. This is preferably a battery cut off switch as is known, for example, for the battery or cable circuitry of conventional vehicle batteries up to 56 V. Both systems mentioned are suitable for the primary power shutoff at high switching voltages and high switching currents. Particularly preferably, the first switch/switch group has an extinguishing agent inside in the region of the separation element, through the separation of which the circuit is disconnected. The extinguishing agent guarantees that a higher energy can be absorbed by the switch at the moment of disconnection of the electric circuit, since the energy of the electric arc is used to vaporize the extinguishing agent and to break it down into its constituents. Switches without such extinguishing agents are not suitable to such an extent for disconnecting electric circuits with high switching voltages at high switching currents. However, as mentioned further above, the disadvantageous effect of the chemical conversion of the extinguishing agent into a conducting material results in the switch very quickly becoming electrically conducting again from a particular energy input after the actual separation operation.

The extinguishing agent can be a solid, powdery or liquid medium. The extinguishing agent is preferably a vaporizable medium. The extinguishing agent is preferably a liquid or gel-like medium, which passes entirely or partially into a gaseous state when the boiling or vaporization temperature is reached. At the same time, it is preferred for the extinguishing agent to also have electrically insulating properties, in order that the electric arc can be extinguished after the two separated parts of the separation region have been moved away from each other sufficiently and there is thereafter a sufficient insulation from a current flow, which is then undesired here, between the separated contacts. The extinguishing agent is preferably an oil, for example silicone oil, with or without thickening agent, or a silane or polysiloxane, for example hexasilane or pentasilane with as little as possible, or even better without, carbon atom content.

According to the invention, as second switch, one can be used which tolerates only a smaller energy input than the first switch, since a large proportion of the energy from the circuit inductance has already been consumed in the first switch. The second switch is preferably one which is capable of reliably and permanently disconnecting electric circuits with currents up to 100 A at voltages at the moment of actuation up to 100 V and, after the disconnection thereof, of being able to insulate voltages up to 1000 V or 2000 V without breakdown. Since the high energy of the electric arc quickly leads, in the first switch, to it becoming conductive again, the second switch is preferably formed such that its switching delay lies in the range of from 1 ms to 10 ms.

By switching delay is meant here the time lag in which the first and the second switch disconnect the electric circuit or are transferred from the closed state into the separated state. However, a second switch with a longer switching delay would also be conceivable, if, for example, the second switch has already been triggered before an electric arc forms in the second switch, but, for example, only shortly thereafter passes from the closed state into the separated state. However, the latter is only possible if the time interval between the tripping of the first and of the second switch necessary for the secure and permanent disconnection of the electric circuit can be defined in advance on the basis of all of the parameters of the electric circuit. The systems which are mentioned above for the first switch can also be used as second switch. Furthermore, however, a conventional battery cut off switch without a safety fuse connected in parallel can also be used, since, in the untriggered state, although this battery cut off switch cannot trip the high currents to be disconnected occurring, it can conduct them very well. Furthermore, after the power has been shut off by the first switch, the second switch only has to be able to trip a current in the range of from 0 A to 100 A at a switching voltage across the switching contacts of the second switch of less than 100 V. Relays or electromagnetic contactors are not very suitable as second switch because the relays or contactors in the automotive field used for the usual operating currents of from 400 A to 1000 A already explode between 0.5 ms and 2 ms at the high currents of over 10 kA that can be supplied for example by lithium ion batteries (the huge and heavy contactors which are used for this purpose in railway train engines are not considered here because they cannot be used at all in the automotive field, as is also the case with electric aircraft, for weight, size and cost reasons).

The high-current/high-voltage switch or battery cut off switch which can be used according to the invention preferably has a casing which surrounds a contact unit/a connecting element defining the current path through the high-current/high-voltage switch or battery cut off switch, which has a first and second connection contact and a separation region. The contact unit is preferably formed such that a current can be supplied to it via the first connection contact and can be discharged from it via the second connection contact, or vice versa. The separation region is preferably formed such that, when it is separated, the current path between the first connection contact and the second connection contact is interrupted. The separation region is preferably arranged inside a reaction chamber. The reaction chamber is preferably filled with an extinguishing agent. If the switch is a high-current/high-voltage switch, the contact unit can have a sabot or be connected to a sabot or a plunger, which is formed such that it can be moved from a starting position into an end position through exposure to pressure, wherein in the end position of the sabot the separation region is separated and an insulation spacing between the first and the second connection contact is achieved.

Through the described arrangement of the series connection of the first and the second switch, electric circuits with considerably greater circuit inductance can be shut off than would be possible with only a single switch. Here, the first switch dissipatively takes on the main proportion of the magnetic energy stored in the circuit inductance at the moment of the separation, while the second switch only has to take on a very small portion of any magnetic energy still present in the circuit inductance during the development thereof. Therefore, the second switch need not necessarily be one which has an extinguishing agent in the vicinity of its separation element. However, if electric circuits with extremely high circuit inductances are involved, for safety reasons the second switch should also be one which has an extinguishing agent in the vicinity of its separation element. Possible extinguishing agents for this are named further above.

In the case of the switches to be used according to the invention, within the meaning of the present invention adiabatic systems can be taken as the starting point as the tripping operations are so quick that a heat exchange with the surroundings is negligible, at least during the separation operation.

The property that the first and the second switch are not formed such that they are capable of permanently and securely disconnecting the electric circuit by themselves is to be attributed to the fact that known high-current/high-voltage switches become conductive again after the actual separation operation in the case of very high switching voltages and very high switching currents. By a permanent and secure disconnection of the electric circuit is meant according to the invention that the switch or switches insulate(s) permanently and thus do not become conductive again.

The device according to the invention can be used both for AC and also for DC electric circuits. Thus, although the current always crosses zero in the case of AC electric circuits, it can never be predicted when the electric circuit is to be shut off. If tripping has to take place at maximum current, effectively the DC current shutoff state exists.

The separation element in the switches can be hollow cylindrical or in the form of an elongate hollow body with a cross-sectional footprint deviating from a circle, with the result that it is ruptured by an internal pressure but, for the so-called battery cut off switch, can also be formed as a solid rod-shaped conductor, which is broken open at one or more points by a plunger or a projectile. In both cases, materials and also extinguishing agents are usually used which can become electrically conductive during or after contact with an electric arc with a correspondingly large energy exposure.

In a design of the device according to the invention, the control unit is preferably formed such that the second switch is transferred from the closed state into the separated state at the earliest when so much energy has been absorbed in the first switch that the remaining amount of energy, which is introduced into the second switch, does not lead to the destruction of the second switch.

In a design of the device according to the invention, the control unit is preferably formed such that the second switch is transferred from the closed state into the separated state at the latest before an amount of energy introduced into the second switch is reached which leads to the destruction thereof.

By the destruction of the switch is meant according to the invention that the switch casing breaks open or the switch explodes as a result of the energy introduced and the formation of the electric arc.

In a design of the device according to the invention, the first and the second switch can preferably be actively transferred from the closed state into the separated state by an actuatable drive. By "actively" is meant any type of mechanical or pyrotechnic energy which can separate the separation region (separation element) of a switch on command. Thus, for example, the separation region can be separated by the action of a pulling or pushing movement. Or a pyrotechnic material, such as for example an igniter (EED) or a mini detonator, is used, which is either located in a reaction chamber or is attached outside the reaction chamber such that it can act on the separation region through a pulling or pushing movement or a shock wave and causes the separation thereof.

In a design of the device according to the invention, the first switch can be passively transferred from the closed state into the separated state when a particular threshold amperage is exceeded, and the second switch can be actively transferred from the closed state into the separated state by an actuatable drive. This passive triggering can be effected, for example, by melting the material forming the separation region, for example on reaching a particular current integral. The passive triggering can also be supported by the action of pyrotechnic explosives and priming compositions, as well as merely by thermal action of decomposing substances, such as for example tetrazene. Devices which move these two ends further away from each other, for example through an existing tensile load which can act after separation of the separation region, can also be attached to one or to both separated parts of the separation region. A tensile load by a pre-stressed spring can be named here by way of example.

In a design of the device according to the invention, the control unit is preferably formed such that it transfers the second switch from the closed state into the separated state as a function of a particular measured current or a particular measured voltage, which is applied to the first switch.

In a design of the device according to the invention, the control unit is preferably formed such that the second switch is transferred from the closed state into the separated state when the current flowing through both switches has fallen to a value in the range of from 25% to 40% of the current present at the start of the separation of the first switch.

In a design of the device according to the invention, the control unit is preferably formed such that the second switch is transferred from the closed state into the separated state when the current flowing through both switches has fallen to a value in the range of from 5% to 15% of the current present at the start of the separation of the first switch.

In a design of the device according to the invention, the control unit is preferably formed such that it transfers the second switch from the closed state into the separated state as a function of a particular measured drop in current in the electric circuit.

The present invention also relates to an electric circuit which, in addition to a device according to the invention, also has a voltage source and an inductive load. In addition to the inductive load, a load resistance can also be present in the electric circuit. All preferred embodiments or designs of the device according to the invention also apply to the electric circuit according to the invention.

The present invention also relates to a method for disconnecting an electric circuit with an inductive load with a first and a second switch, which are connected to each other in series and are transferred from a closed state into a separated state for disconnecting the electric circuit, wherein none of the switches is formed such that it is capable of permanently disconnecting the electric circuit by itself, wherein the second switch is transferred from the closed state into the separated state after the first switch.

In a design of the method according to the invention it is preferred for the second switch to be transferred from the closed state into the separated state at the earliest when so much energy has been absorbed in the first switch that the remaining amount of energy, which is introduced into the second switch, does not lead to the destruction thereof.

In a design of the method according to the invention, the second switch is preferably transferred from the closed state into the separated state at the latest before an amount of energy introduced into the second switch is reached which leads to the destruction thereof.

In a design of the method according to the invention it is preferred for the first and the second switch to be actively transferred from the closed state into the separated state by an actuatable drive.

In a design of the method according to the invention it is preferred for the first switch to be passively transferred from the closed state into the separated state when a particular nominal value is exceeded, and the second switch to be actively transferred from the closed state into the separated state by an actuatable drive. For this purpose, the actuatable drive is preferably connected to a control unit which actuates the drive and, in this way, can transfer the second switch from the closed state into the separated state.

In a design of the method according to the invention it is preferred for the second switch to be transferred from the closed state into the separated state as a function of a particular measured current or a particular measured voltage through the first switch.

In a design of the method according to the invention it is preferred for the second switch to be transferred from the closed state into the separated state when the current flowing through both switches has fallen to a value in the range of from 25% to 40% of the current present at the start of the separation of the first switch.

In a design of the method according to the invention, the control unit is preferably formed such that the second switch is transferred from the closed state into the separated state when the current flowing through both switches has fallen to a value in the range of from 5% to 15% of the current present at the start of the separation of the first switch.

In a design of the method according to the invention, the control unit is preferably formed such that it transfers the second switch from the closed state into the separated state as a function of a particular measured drop in current in the electric circuit.

A device according to the invention or an electric circuit according to the invention is preferably used in the method according to the invention. Thus, all preferred embodiments and designs which are mentioned further above in connection with the device according to the invention are also intended to apply to the method according to the invention. For transferring the second switch from the closed into the separated state, a control unit as mentioned further above is preferably also used. The same also applies to the second switch, if it is actuated by the control unit.

The present invention is now explained more precisely with reference to the following figures. However, these are merely exemplary in nature and are intended to explain the present invention by way of example.

FIG. 1: FIG. 1 shows an electric circuit according to the invention with a device according to the invention.

Figure 2:
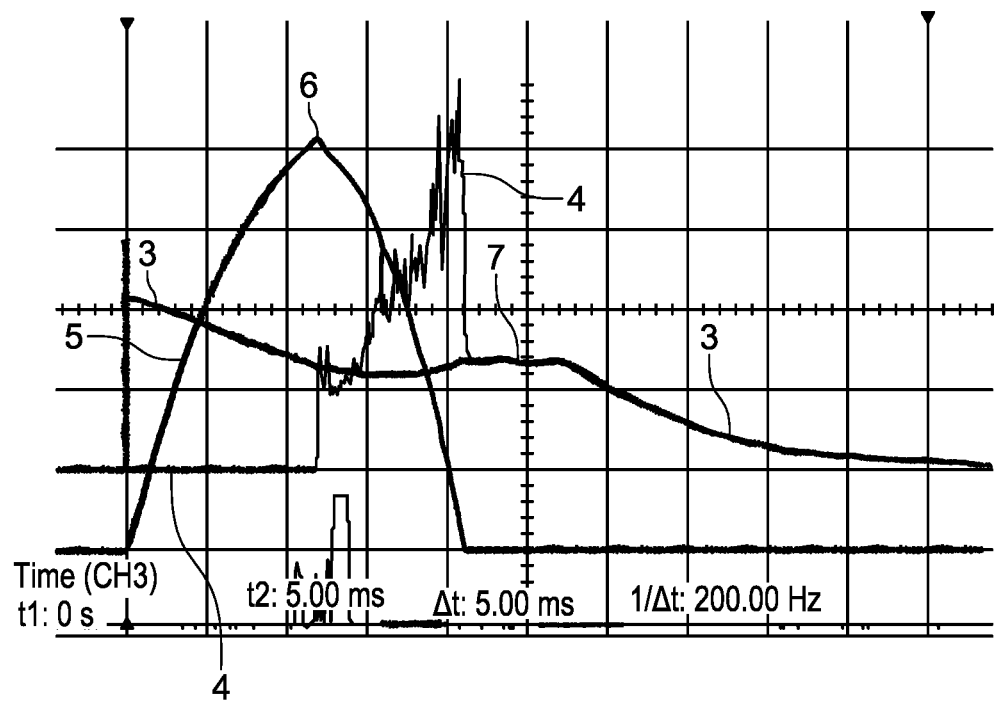

FIG. 2: FIG. 2 shows the voltage progression of the capacitor bank over time, the voltage progression across the first switch, as well as the current progression in the whole electric circuit shortly before and after the tripping of the first switch in an electric circuit according to FIG. 1.

FIG. 3: FIG. 3 shows the progression over time of the current through the first and the second switch, which are connected in series in an electric circuit according to FIG. 1.

Figure 4A:
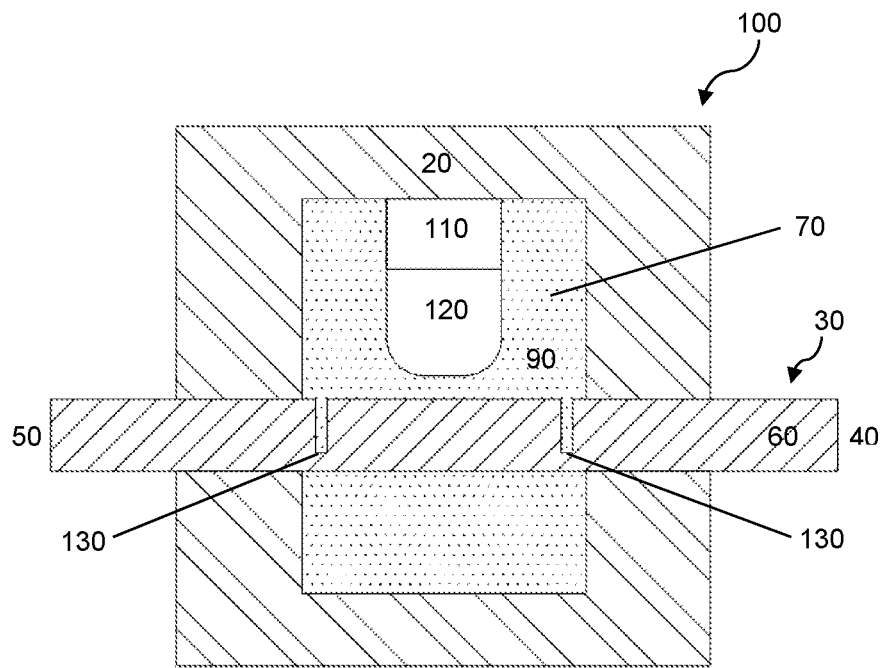

FIG. 4a: FIG. 4a shows a battery cut off switch in the closed state by way of example, as can be used as second switch or in conjunction with a safety fuse connected in parallel as part of a first switch group.

Figure 4B:
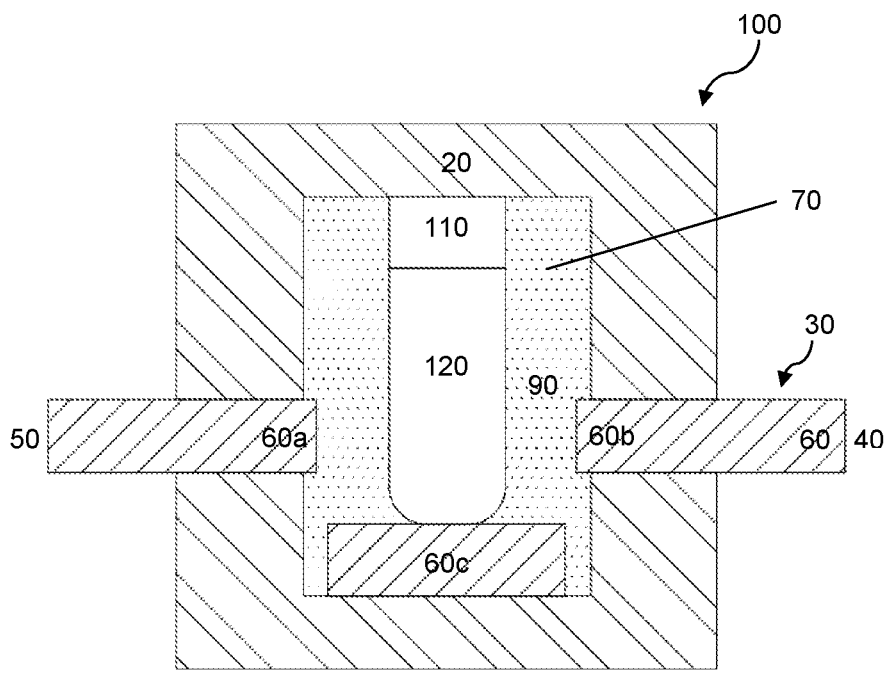

FIG. 4b: FIG. 4b shows the battery cut off switch of FIG. 4a in the separated state.

Figure 5:
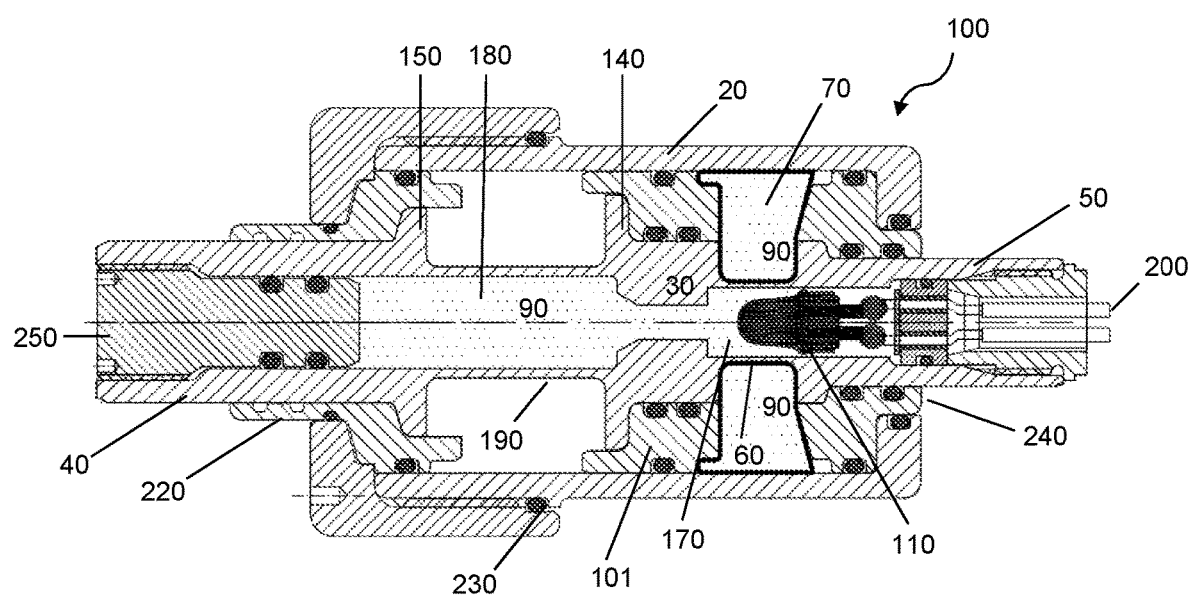

FIG. 5: FIG. 5 shows a high-current/high-voltage switch by way of example, as can be used as first or second switch.

FIG. 1 shows an electric circuit 1 according to the invention with a device according to the invention (first switch S1, second switch S2 and control unit 2). The electric circuit 1 comprises a voltage source, which is labelled with + and −, a first switch S1 and a second switch S2, which are connected to each other in series, as well as an inductive load L and a load resistance $W_L$. Furthermore, a control unit 2 is also provided, which for example evaluates the current progression through the first switch S1 and generates an ignition signal to the second switch S2 as a function thereof. In this way, the second switch S2 can be transferred from the closed state into the separated state, in which the second switch S2 interrupts the electric circuit 1. The first switch S1 can be actively triggered by an ignition signal from the control unit 2, but can also be passively tripped by exceeding a particular threshold amperage. The control unit 2 is formed such that it only trips the second switch S2 when enough energy, which is stored in the inductive load L, has been consumed in the first switch S1 after it has tripped. In this way it is guaranteed that, in the case of tripping, the energy which is stored in the inductive load L is divided between the two switches S1 and S2, with the result that, even if the first switch S1 becomes conductive again for the reasons mentioned at the beginning, a permanent and secure disconnection of the electric circuit is possible. The control unit 2 can have a comparator/ignition electronics for the evaluation of the current progression and the generation of an ignition signal for the second switch S2. The first switch S1 can be a high-current/high-voltage switch, as is shown in FIG. 5. However, it can also be a battery cut off switch, as is shown in FIGS. 4a and 4b, to which a safety fuse is connected in parallel. The second switch S2 can also be a high-current/high-voltage switch, as is shown in FIG. 5, but it can also be a battery cut off switch, as is shown in FIGS. 4a and 4b, without a safety fuse necessarily being connected to it in parallel. If the first switch S1 is a high-current/high-voltage switch, the second switch S2 can be either a high-current/high-voltage switch or a battery cut off switch. If the first switch S1 is a parallel circuit consisting of battery cut off switch and safety fuse, it is preferred for the second switch to be a battery cut off switch. The reason for this is that, as a rule, the second switch needs to be able to absorb less energy than the first switch, and then, for cost reasons, a cheaper second switch is also used.

FIG. 2 shows the voltage progression 3 of the capacitor bank over time, the voltage progression 4 across the connection contacts of the first switch, as well as the current progression 5 of the whole electric circuit shortly before and after the tripping of the first switch in an electric circuit according to FIG. 1. For this, a high-current/high-voltage switch, as shown in FIG. 5, was used as first switch. The curve 3 shows the voltage progression of the capacitor bank. The capacitor bank has an initial voltage of 1200 V, which drops to 650V at the moment of the start of the separation of the switch during the current flow. The curve 4 shows the voltage progression across the electrical connections of the first switch. The curve 5 shows the current progression of the whole electric circuit. The point in time 6 is the point at which the first switch is opened with the separation conditions of 650 V and 31 kA then prevailing here. Up until the point in time 6 at which the first switch is opened, the current in the whole electric circuit increases (current progression 5). After the start of the separation at 6, the current in the whole electric circuit decreases drastically. In curve 4 (voltage progression across the first switch), after the start of the separation thereof, a large increase in voltage can be seen which goes far beyond the voltage at the moment of the start of the separation, even far beyond the charging voltage of the capacitor bank. This is due to the magnetic field of the circuit inductance, the collapse of which after the point at which the separation starts is to be prevented by an induced voltage forming here or a current induced here (Lenz's law), the direction of which is the same as the current in the electric circuit before the start of the separation. At the end of the separation, thus when the current in the electric circuit is equal to 0 A, the voltage across the first switch (curve 4) is again equal to the voltage of the capacitor bank now separated from the electric circuit. The insulation plateau 7 starts at the end of the separation. At this point in time, the first switch insulates completely. This can be seen in the fact that the voltage of the capacitor bank (curve 3) is equal to the voltage across the switch contacts (curve 4), while the insulation plateau 7 does not decrease further. However, it can also be seen that the first switch becomes conductive again after a certain time since the insulation plateau 7 is not maintained permanently, but rather the voltage progression of the capacitor bank 3 goes further down again after the insulation plateau 7, i.e. there is a further discharging of the capacitor bank here. It is thus clearly shown that the high-current/high-voltage switch, as shown in FIG. 5, becomes conductive again a certain time after the electric circuit has been disconnected. If anything, the discharging current here is very small at approx. 10 A, which can no longer be seen in the current curve 5 because of the very large current scale here.

FIG. 3 shows, schematically, the linearized current progression 10 over time across the first and the second switch, which are connected in series in an electric circuit according to FIG. 1. The point in time 8 at which the first switch trips lies at 0 seconds. The curve 10 indicates the decreasing current progression across the first and the second switch. The curve 11 shows the energy input into the first switch after the first switch has tripped. The energy progression 11 follows the indicated curve until the second switch is tripped at 9. If there were no second switch, the maximum energy absorption of the first switch would end at 16, which would lie far above the power rating of 11000 A of the switch 1 (see dashed line). The curve 12 shows the decrease in energy in the inductive load after the first switch has tripped.

If the second switch is tripped at the point in time 9, the current progression across the first and the second switch will decrease more quickly because of the much lower loading of the second switch at the point at which its separation starts, which can be seen in curve 13. Likewise, a quicker decrease in energy 15 also takes place in the inductive load after the second switch has tripped. The curve 14 shows the energy progression across the second switch after the second switch has tripped, i.e. shows the energy which is absorbed in the second switch. The maximum energy absorption of the second switch is reached with the very low level 17, the second switch will therefore be able to securely and permanently disconnect the electric circuit with a large reserve, whereas the first switch will easily become conductive later because it has been loaded beyond its limit at 11 kA.

FIG. 4a and FIG. 4b show schematic views of a battery cut off switch 100 before and after the separation of the separation region 60. The battery cut off switch 100 has a casing 20, through which the contact unit 30 passes. The contact unit 30 has a first connection contact 40 on one side and a second connection contact 50 on the other side, which are electrically connected to each other via the separation region 60 in the battery cut off switch 100 in FIG. 4a. The separation region 60 runs through a reaction chamber 70, which is surrounded by the casing 20. As shown in FIG. 4a, the separation region 60 can have two predetermined breaking points 130, but can also have only one or more than two predetermined breaking points. The reaction chamber 70 is preferably filled with an extinguishing agent 90. Furthermore, an actuatable drive 110, which is connected to a ram 120, is provided in the reaction chamber 70. The actuatable drive can be actuated by the control unit. The drive 110 can be designed, for example, as a pyrotechnic drive. If the drive 110 is activated, the ram 120 exposes the separation region 60 of the contact unit 30 to pressure. This results in a separation of the separation region 60 at the predetermined breaking points 130, whereby the first connection contact 40 and the second connection contact 50 are no longer connected. FIG. 4a shows the battery cut off switch 100 in the conducting position, whereas FIG. 4b shows the same battery cut off switch 100 after it has tripped in the non-conducting position, in which the separation region 60 is separated into the separated parts 60a, 60b and 60c. The motive force, which is available for tearing open the contact unit in addition to the hydraulic force from the product of pressure in the drive 110×the depressed surface area of the ram 120, can be adjusted via the distance between the ram 120 and the contact unit 30.

FIG. 5 shows a high-current/high-voltage switch 100, which comprises a casing 20, in which a contact unit 30 is arranged. The casing 20 is formed such that it withstands a pressure, generated inside the casing 20, which is generated for example in the case of a pyrotechnic triggering of the high-current/high-voltage switch 100, without there being the danger of damage or even bursting. In the embodiment example represented, the contact unit 30 is formed as a switch tube depressed by the sabot 101 in the upsetting region, with the result that it is formed as a tube in the separation region 60 and the upsetting region 190. In the embodiment example represented, the contact unit 30 has a first connection contact 40 with a larger diameter and a second connection contact 50 with a smaller diameter. Adjoining the first connection contact 40 is a flange 150 extending radially outwards, which is braced on an annular insulator element 220, which consists of an insulating material, for example a plastic, such that the contact unit 30 cannot be moved out of the casing 20 in an axial direction. For this purpose, the insulator element 220 has an annular shoulder on which the flange 150 of the contact unit 30 is braced. In addition, the insulator element 220 insulates the casing 20 from the contact unit 30. The contact unit 30 has an upsetting region 190 adjoining the flange 150 in the axis of the contact unit 30. In the upsetting region 190, which has a predetermined axial extent, the wall thickness of the contact unit is chosen and matched to the material such that, when the high-current/high-voltage switch 100 is triggered as a result of a plastic deformation of the contact unit 30 in the upsetting region 190, the upsetting region is shortened in the axial direction by a predetermined distance, whereby the separating distance present after the separation operation is considerably increased and results here additively from the upsetting distance and the length of the separation region 60.

Adjoining the upsetting region 190 in the axial direction of the contact unit 30 is a flange 140, on which a sabot 101 sits in the embodiment example represented. The sabot 101 surrounds the contact unit 30 such that an insulating region of the sabot 101 engages between the outer circumference of the flange 140 and the inner wall of the casing 20. If a pressure acts on the surface of the sabot 101, a force is generated which compresses the upsetting region 190 of the contact unit 30 via the flange 140. This force is chosen such that, during the triggering operation of the high-current/high-voltage switch 100, an upsetting of the upsetting region 190 occurs, wherein the sabot 101 is moved from its starting position (status before the high-current/high-voltage switch 100 is triggered) into an end position (after the tripping operation has been completed).

Adjoining the sabot 101 or the flange 140 of the contact unit 30 is a separation region 60. The second connection contact 50 then adjoins this side of the contact unit 30. A closure 240 closes the casing 20.

In the embodiment example represented, the sabot 101 is pushed onto the contact unit 30 from the side of the connection contact 50 during the assembly of the high-current/high-voltage switch 100. The closure 240 is designed as an annular component, which has an external diameter which substantially corresponds to the internal diameter of the casing 20.

In the axial end of the contact unit 30 in the region of the second connection contact 50 a drive, preferably a pyrotechnic drive, is provided. The electrical connection lines 200 of the drive 110 can be guided outwards through an opening of the annular closure 240.

The separation region 60 is dimensioned such that it at least partially tears open through the gas pressure generated or the shock wave generated by the drive 110, with the result that the pressure or the shock wave can also propagate out of the combustion chamber 170 into the reaction chamber 70, designed as a surrounding annular space.

When the high-current/high-voltage switch 100 is activated by means of the drive 110, a pressure or a shock wave is thus generated on the side of the sabot 101 facing away from the upsetting region 190, whereby the sabot 101 is exposed to a corresponding axial force. This force is chosen through a suitable dimensioning of the pyrotechnic material such that in the upsetting region 190 the contact unit 30 is plastically deformed, torn open or caved in and the sabot 101 is then moved in the direction of the first connection contact 40. The pyrotechnic material is dimensioned such that, after the separation region 60 has been broken open or caved in, the movement of the sabot 101 moves the two separation halves sufficiently far away from each other, in cooperation with the vaporization of the extinguishing agent 90 then even into an end position.

Directly after the pyrotechnic material has been activated, the separation region 60 is thus at least partially torn open or caved in. If the tearing open or caving in has not already been effected before the start of the axial movement of the sabot 101 over the entire circumference of the separation region 60, a remaining residue of the separation region 60, which causes another electrical contact, is completely torn open by the axial movement of the sabot 101, intensified by the very rapid heating then occurring here of the residual cross section of the conductor, which is then only small here, due to the electric current flowing here.

In the embodiment shown in FIG. 5, an extinguishing agent 90 is located in the combustion chamber 170 and in the reaction chamber 70, which in the case of the detonation or deflagration of the pyrotechnic material promotes the propagation of shock waves, with the result that in this way less activatable material has to be used and the walls of the separation region 60 can be kept sufficiently thick such that the assembly can also still be used with high operating currents. The extinguishing agent 90 serves to suppress or extinguish an electric arc between the separated ends of the separation region 60.

Furthermore, a channel can be provided in the high-current/high-voltage switch 100, which extends underneath the sabot 101, in particular in the flange 140, preferably centrally in the axial direction, and connects the combustion chamber 170 to an upsetting chamber 180 underneath the upsetting region 190. In the embodiment example represented, the contact unit 30 is thus formed further as a continuous switch tube. In this embodiment, the combustion chamber 170, the channel, the reaction chamber 70 and the upsetting chamber 180 can all be filled with the extinguishing agent 90. The channel ensures that, when the high-current/high-voltage switch 100 is triggered and during the associated movement of the sabot 101 from the starting position into the end position, the increasing volume in the region of the combustion chamber 170 and the reaction chamber 70 is also refilled with extinguishing agent 90. Through the movement of the sabot 101 from the starting position into the end position, extinguishing agent 90 in the upsetting chamber 180 is compressed and injected through the channel in the direction of the region of the combustion chamber 170 and here directly onto the separation region 60. In this way, an electric arc between the separated parts of the separation region 60 can additionally be suppressed or extinguished.

Furthermore, sealing elements 230 for sealing the various chambers 70, 170 and 180 against the escape of extinguishing agent 90 and for sealing the various components from each other are preferably provided in the high-current/high-voltage switch 100.

LIST OF REFERENCE NUMBERS

1 electric circuit
S1 first switch
S2 second switch
2 control unit
L inductive load
$W_L$ load resistance
3 voltage progression of the capacitor bank
4 voltage progression in the first switch
5 current progression of the whole electric circuit
6 point at which the first switch is opened
7 insulation plateau
8 point in time at which the first switch trips
9 point in time at which the second switch trips 10 current progression across the first and the second switch
11 energy input into the first switch after the first switch has tripped (if the second switch does not trip)
12 decrease in energy of the magnetic field of the inductive load after the first switch has tripped
13 current progression across the first and the second switch, if the second switch trips
14 energy input into the second switch after the first switch has tripped
15 decrease in energy of the magnetic field of the inductive load after the second switch has tripped
16 maximum energy absorption of the first switch (if the second switch does not trip)
17 maximum energy absorption of the second switch
100 switch (high-current/high-voltage switch/battery cut off switch)
20 casing
30 contact unit
40 first connection contact
50 second connection contact
60 separation region
60a separated parts of the separation region
60b separated parts of the separation region
60c separated parts of the separation region
70 reaction chamber
90 extinguishing agent
101 sabot
110 drive
120 ram
130 predetermined breaking point
140 flange
150 flange
170 combustion chamber
180 upsetting chamber
190 upsetting region
200 electrical connection lines
220 insulator element
230 sealing element
240 closure
250 closure element for upsetting chamber

The invention claimed is:

1. A device for disconnecting an electric circuit with an inductive load, the device comprising:
a first switch/switch group and a second switch/switch group connected to each other in series and transferable from a closed state into a separated state for disconnecting the electric circuit, wherein none of the first switch/switch group and the second switch/switch group are configured to securely disconnect the electric circuit permanently by itself; and
a control unit configured to actuate the second switch/switch group such that the second switch/switch group is transferred from the closed state into the separated state after the first switch/switch group, wherein:
the first switch/switch group and the second switch/switch group are actively transferable from the closed state into the separated state by an actuatable drive, or the first switch/switch group is passively transferable from the closed state into the separated state when the current exceeds a particular nominal value, and the second switch/switch group is actively transferable from the closed state into the separated state by the actuatable drive, and
the control unit is further configured to transfer the second switch/switch group from the closed state into the separated state as a function of a particular measured current or a particular measured voltage through the first switch/switch group.

2. The device according to claim 1, wherein the control unit is further configured to actuate the second switch/switch group such that the second switch/switch group is transferred from the closed state into the separated state at, earliest, when so much energy has been absorbed in the first switch/switch group that a remaining amount of energy, which is introduced into the second switch/switch group, does not lead to the destruction thereof.

3. The device according to claim 1, wherein the control unit is further configured to actuate the second switch/switch group such that the second switch/switch group is transferred from the closed state into the separated state, at latest, before an amount of energy introduced into the second switch/switch group is reached which leads to the destruction thereof.

4. The device according to claim 1, wherein the control unit is further configured to transfer the second switch/switch group from the closed state into the separated state when the current flowing through both the first switch/switch group and the second switch/switch group has fallen to a value in the range of from 25% to 40% of the current present at the start of the separation of the first switch/switch group.

5. The device according to claim 1, wherein the control unit is further configured to transfer the second switch/switch group from the closed state into the separated state when the current flowing through both the first switch/switch group and the second switch/switch group has fallen to a value in the range of from 5% to 15% of the current present at the start of the separation of the first switch/switch group.

6. The device according to claim 1, wherein the control unit is further configured to transfer the second switch/switch group from the closed state into the separated state as a function of a particular measured drop in current in the electric circuit.

7. The device according to claim 1, wherein more than two switches/switch groups are electrically connected in series and are actuatable one after the other.

8. An electric circuit comprising:
a voltage sources;
a load resistance;
an inductive load; and
a device comprising: a first switch/switch group and a second switch/switch group connected to each other in series and transferable from a closed state into a separated state for disconnecting the electric circuit, wherein none of the first switch/switch group and the second switch/switch group are configured to securely disconnect the electric circuit permanently by itself; and a control unit configured to actuate the second switch/switch group such that the second switch/switch group is transferred from the closed state into the separated state after the first switch/switch group, wherein:
the first switch/switch group and the second switch/switch group are actively transferable from the closed state into the separated state by an actuatable drive, or the first switch/switch group is passively transferable from the closed state into the separated state when the current exceeds a particular nominal value, and the second switch/switch group is actively transferable from the closed state into the separated state by the actuatable drive, and the control unit is further configured to transfer the second switch/switch group from the closed state into the separated state as a function of a particular measured current or a particular measured voltage through the first switch/switch group.

9. A method comprising:

disconnecting an electric circuit, the electric circuit comprising: a voltage source; a load resistance; an inductive load; a device comprising: a first switch/switch group and a second switch/switch group connected to each other in series and transferable from a closed state into a separated state for disconnecting the electric circuit, wherein none of the first switch/switch group and a second switch/switch group is configured to securely disconnect the electric circuit permanently by itself; and a control unit configured to actuate the second switch/switch group such that the second switch/switch group is transferred from the closed state into the separated state after the first switch/switch group, wherein: the first switch/switch group and the second switch/switch group are actively transferable from the closed state into the separated state by an actuatable drive, or the first switch/switch group is passively transferable from the closed state into the separate state when the current exceeds a particular nominal value, and the second switch/switch group is actively transferable from the closed state into the separated state by the actuatable drive, and the control unit is further configured to transfer the second switch/switch group from the closed state into the separated state as a function of a particular measured current or a particular measured voltage through the first switch/switch group, the disconnecting the electric circuit comprising:

transferring the second switch/switch group from the closed state into the separated state after the first switch/switch group.

10. The method according to claim 9, wherein the second switch/switch group is transferred from the closed state into the separated state, at earliest, when so much energy has been absorbed in the first switch/switch group that a remaining amount of energy, which is introduced into the second switch/switch group, does not lead to the destruction thereof.

11. The method according to claim 9, wherein the second switch/switch group is transferred from the closed state into the separated state, at latest, before an amount of energy introduced into the second switch/switch group is reached which leads to the destruction thereof.

12. The method according to claim 9, wherein the second switch/switch group is transferred from the closed state into the separated state when the current flowing through both the first switch/switch group and the second switch/switch group has fallen to a value in a range of from 25% to 40% of a current present at a start of the separation of the first switch/switch group.

13. The method according to claim 9, further comprising transferring the second switch/switch group from the closed state into the separated state when the current flowing through both the first switch/switch group and the second switch/switch group has fallen to a value in the range of from 5% to 15% of the current present at the start of the separation of the first switch/switch group.

14. The method according to claim 9, wherein the control unit further comprising transferring the second switch/switch group from the closed state into the separated state as a function of a particular measured drop in current in the electric circuit.

* * * * *